(12) United States Patent
Liu

(10) Patent No.: US 11,277,782 B2
(45) Date of Patent: Mar. 15, 2022

(54) SERVICE ACCESS METHOD AND DEVICE

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/735,435

(22) Filed: Jan. 6, 2020

(65) Prior Publication Data

US 2020/0145901 A1 May 7, 2020

Related U.S. Application Data

(63) Continuation of application No. PCT/CN2017/096275, filed on Aug. 7, 2017.

(51) Int. Cl.
*H04W 40/22* (2009.01)
*H04W 4/50* (2018.01)
*H04L 12/725* (2013.01)
*H04W 40/28* (2009.01)
*H04W 48/16* (2009.01)
(Continued)

(52) U.S. Cl.
CPC .......... *H04W 40/22* (2013.01); *H04L 45/302* (2013.01); *H04W 4/50* (2018.02); *H04W 40/28* (2013.01); *H04W 48/16* (2013.01); *H04W 84/12* (2013.01)

(58) Field of Classification Search
CPC ....... H04W 40/22; H04W 4/50; H04W 40/28; H04W 48/16; H04W 84/12; H04W 48/18; H04W 48/00; H04L 45/302
See application file for complete search history.

(56) References Cited

U.S. PATENT DOCUMENTS 6,680,950 B1 * 1/2004 Nagata .............. H04W 74/0816
370/445
9,432,891 B2 * 8/2016 Lim .................. H04W 36/0016
(Continued)

FOREIGN PATENT DOCUMENTS

CN 101453777 A 6/2009
CN 101662810 A 3/2010
(Continued)

OTHER PUBLICATIONS

Willemen, P., Laselva, D., Wang, Y. et al. SON for LTE-WLAN access network selection: design and performance. J Wireless Com Network 2016, 230 (2016). https://doi.org/10.1186/s13638-016-0726-x (Year: 2016).*

(Continued)

*Primary Examiner* — Phirin Sam
*Assistant Examiner* — Tarell A Hampton
(74) *Attorney, Agent, or Firm* — Ladas & Parry, LLP

(57) ABSTRACT

Embodiments of the present application provide a service access method and device, capable of improving user experience. The method includes: a first device determines, according to path priority information, a target access path for a service to be accessed, where the path priority information is used to indicate an access path preferentially selected by the first device; and the first device accesses the service to be accessed by using the target access path.

10 Claims, 2 Drawing Sheets

(51) Int. Cl.
*H04W 84/12* (2009.01)
*H04L 45/302* (2022.01)

(56) References Cited

U.S. PATENT DOCUMENTS

| | | | | |
|---|---|---|---|---|
| 2013/0210385 | A1* | 8/2013 | Ahmed | H04W 48/16 455/411 |
| 2017/0093722 | A1* | 3/2017 | Gonzalez | H04L 47/125 |
| 2018/0098276 | A1* | 4/2018 | Livanos | H04W 4/025 |
| 2018/0176823 | A1* | 6/2018 | Kim | H04W 28/0247 |
| 2018/0199279 | A1* | 7/2018 | Baek | H04W 72/02 |
| 2018/0270781 | A1* | 9/2018 | Baek | H04W 60/06 |
| 2019/0007992 | A1* | 1/2019 | Kim | H04W 64/006 |
| 2019/0208562 | A1* | 7/2019 | Kim | H04W 60/00 |
| 2019/0239133 | A1* | 8/2019 | Yu | H04W 36/0033 |
| 2020/0092802 | A1* | 3/2020 | Yang | H04W 48/16 |
| 2020/0205054 | A1* | 6/2020 | Liu | H04W 36/0022 |

FOREIGN PATENT DOCUMENTS

| | | |
|---|---|---|
| CN | 103052142 A | 4/2013 |
| EP | 3322223 A1 | 5/2018 |
| RU | 2477019 C2 | 2/2013 |
| RU | 2557460 C1 | 7/2015 |
| WO | 2012092935 A1 | 7/2012 |
| WO | 2017063485 A1 | 4/2017 |
| WO | 2019028609 | 2/2019 |

OTHER PUBLICATIONS

Manisha, N. P. Singh, "Efficient network selection using game theory in a heterogeneous wireless network", Computational Intelligence and Computing Research (ICCIC) 2015 IEEE International Conference on, pp. 1-4, 2015. (Year: 2015).*

Q. Nguyen-Vuong, N. Agoulmine, E. H. Cherkaoui and L. Toni, "Multicriteria Optimization of Access Selection to Improve the Quality of Experience in Heterogeneous Wireless Access Networks," in IEEE Transactions on Vehicular Technology, vol. 62, No. 4, pp. 1785-1800, May 2013. (Year: 2013).*

B. Hu, N. Li and J. Zhang, "IASS: An intelligence access selection scheme for heterogeneous networks," 2015 International Conference on Information Networking (ICOIN), 2015, pp. 531-536, (Year: 2015).*

I. Smaoui, F. Zarai, R. Bouallegue and L. Kamoun, "Multi-criteria dynamic access selection in heterogeneous wireless networks," 2009 6th International Symposium on Wireless Communication Systems, 2009, pp. 338-342, (Year: 2009).*

H. Xing, D. Mu, X. Ge and R. Chai, "An NN-based access network selection algorithm for heterogeneous networks," 2013 22nd Wireless and Optical Communication Conference, 2013, pp. 378-383. (Year: 2013).*

3GPP TS 23.161 V14.0.0 (Mar. 2017); 3rd Generation Partnership Project; Technical Specification Group Services and System Aspects; Network-Based IP Flow Mobility (NBIFOM);Stage 2(Release 14).

3GPP TS 36.300 V13.2.0 (Dec. 2015); 3rd Generation Partnership Project; Technical Specification Group Radio Access Network;Evolved Universal Terrestrial Radio Access (E-UTRA) and Evolved Universal Terrestrial Radio Access Network (E-UTRAN);Overall description;Stage 2(Release 13).

International Search Report in the international application No. PCT/CN2017/096275 dated Apr. 28, 2018.

Written Opinion of the International Search Authority in the international application No. PCT/CN2017/096275, dated Apr. 28. 2018.

The first Office Action of corresponding Russian application No. 2019143156, dated Sep. 2, 2020.

The EESR of corresponding European application No. 17920756.8, dated Apr. 30, 2020.

The first Office Action of corresponding Canadian application No. 3065626, dated Feb. 25, 2021.

The first Office Action of corresponding Indian application No. 201917050073, dated May 26, 2021.

The second Office Action of corresponding Canada application No. 3065626, dated Nov. 3, 2021.

The first Office Action of corresponding European application No. 17920756.8, dated Dec. 2, 2021.

* cited by examiner

SERVICE ACCESS METHOD AND DEVICE

CROSS-REFERENCE TO RELATED APPLICATIONS

This application is a continuation application of the International application PCT/CN2017/096275, filed on Aug. 7, 2017, entitled "SERVICE ACCESS METHOD AND DEVICE", the content of which is hereby incorporated by reference in its entirety.

TECHNICAL FIELD

The present application relates to the field of communications and, in particular, to a service access method and device.

BACKGROUND

In a 5G system, a terminal device may access a service through a $3^{rd}$ generation partnership project (3GPP) network or a non-3GPP network. Specifically, the network side has a service access management node, which may be responsible for managing the service accessed through the 3GPP network or the non-3GPP network.

Therefore, for the terminal device or the service access management node, it is an urgent problem to be solved with regard to how to select a suitable service access path to improve user experience.

SUMMARY

Embodiments of the present application provide a service access method and device, which can improve user experience.

In a first aspect, a service access method is provided, including:

determining, by a first device, according to path priority information, a target access path for a service to be accessed, where the path priority information is used to indicate an access path preferentially selected by the first device; and accessing, by the first device, the service to be accessed by using the target access path.

Therefore, for the service access method in the embodiment of the present application, the first device may determine, according to path priority information, a target access path for a service to be accessed, and thus access the service to be accessed by using the target access path. Since the path priority information is usually set by a user according to his preference, user experience can be improved by accessing the service to be accessed of the terminal with the use of the target access path that is determined according to the path priority information.

In conjunction with the first aspect, in some implementations of the first aspect, the path priority information includes a priority order of at least one access path, and the determining, by a first device, according to path priority information, a target access path for a service to be accessed includes:

determining, from the at least one access path, the target access path for the service to be accessed.

For example, an access path with the highest priority may be selected from the at least one access path as the target access path for the service to be accessed, or an access path may be randomly selected from the at least one access path as the target access path, or the like; since the at least one access path is the preferentially selected access path that is set by the user, the use of one of the at least one access path as the target access path for the service to be accessed can improve user experience.

In conjunction with the first aspect, in some implementations of the first aspect, the path priority information includes:

a correspondence between the preferentially selected access path and at least one of a service type of the service to be accessed, time when the service to be accessed is initiated, and an area in which the service to be accessed is initiated.

In an implementation, the path priority information may include at least one of a first correspondence between the service type of the service to be accessed and the preferentially selected access path, a second correspondence between the time when the service to be accessed is initiated and the preferentially selected access path, and a third correspondence between the area in which the service to be accessed is initiated and the preferentially selected access path; alternatively, the path priority information may further include a fourth correspondence among the service type of the service to be accessed and the time when the service to be accessed is initiated and the preferentially selected access path, or a fifth correspondence among the service type of the service to be accessed and the area in which the service to be accessed is initiated and the preferentially selected access path, or a sixth correspondence among the area in which the service to be accessed is initiated and the time when the service to be accessed is initiated and the preferentially selected access path, this is not limited in the embodiment of the present application.

In conjunction with the first aspect, in some implementations of the first aspect, the determining, by a first device, according to path priority information, a target access path for a service to be accessed includes:

determining, by the first device, the target access path for the service to be accessed according to the path priority information and the at least one of the service type of the service to be accessed, the time when the service to be accessed is initiated, and the area in which the service to be accessed is initiated.

In conjunction with the first aspect, in some implementations of the first aspect, the determining, by the first device, the target access path for the service to be accessed according to the path priority information and the at least one of the service type of the service to be accessed, the time when the service to be accessed is initiated, and the area in which the service to be accessed is initiated includes:

determining, by the first device, the target access path for the service to be accessed according to the service type of the service to be accessed and a first correspondence between the service type of the service to be accessed and the preferentially selected access path.

In an implementation, the first correspondence may be a one-to-one correspondence or a many-to-one correspondence. For example, one service type may correspond to one access path, or many service types correspond to one access path. By way of an example instead of a limitation, a voice service or an emergency call service may correspond to a 3GPP path, and other types of services may correspond to a non-3GPP path.

In conjunction with the first aspect, in some implementations of the first aspect, the determining, by the first device, the target access path for the service to be accessed according to the path priority information and the at least one of the service type of the service to be accessed, the time when the service to be accessed is initiated, and the area in which the service to be accessed is initiated includes:

determining, by the first device, the target access path for the service to be accessed according to the time when the service to be accessed is initiated and a second correspondence between the time when the service to be accessed is initiated and the preferentially selected access path.

In an implementation, the second correspondence may be a one-to-one correspondence or a many-to-one correspondence, for example, one time period may correspond to one access path, or many time periods may correspond to one access path. By way of an example instead of a limitation, a morning peak (e.g., from 7 a.m. to 9 a.m.) and an evening peak (e.g., from 5 p.m. to 7 p.m.) may correspond to a 3GPP path, since during this time period, the user is generally on the way to work or on the way home from work so that a wireless local area network (WLAN) is unavailable. In this case, a 3GPP network may be used for service access so that user experience can be improved. Other time periods may correspond to a non-3GPP path, since during other time periods, the user is generally at home or at the company, use of the WLAN for service access can improve user experience.

In conjunction with the first aspect, in some implementations of the first aspect, the determining, by the first device, the target access path for the service to be accessed according to the path priority information and the at least one of the service type of the service to be accessed, the time when the service to be accessed is initiated, and the area in which the service to be accessed is initiated includes:

determining, by the first device, the target access path for the service to be accessed according to the area in which the service to be accessed is initiated and a third correspondence between the area in which the service to be accessed is initiated and the preferentially selected access path.

In an implementation, the third correspondence may be a one-to-one correspondence or a many-to-one correspondence. For example, one area may correspond to one access path, or many areas may correspond to one access path. By way of an example instead of a limitation, it may be set that an indoor area corresponds to a non-3GPP path and an outdoor area corresponds to a 3GPP path. Since a WLAN has poor signal quality in the outdoor area, in this case, a 3GPP network may be used for service access so that user experience can be improved, in a case where the WLAN is provided in the indoor area, the WLAN is used for service access so that user experience can be improved.

In conjunction with the first aspect, in some implementations of the first aspect, the first device is a terminal device or a network device.

In conjunction with the first aspect, in some implementations of the first aspect, the method further includes:

acquiring, by the first device, the path priority information.

In conjunction with the first aspect, in some implementations of the first aspect, when the first device is a network device, the acquiring, by the first device, the path priority information includes:

acquiring, by the first device, the path priority information from a core network device or a terminal device.

Here, the first device and the core network device may be different core network devices, or the first device is a third-party device.

In conjunction with the first aspect, in some implementations of the first aspect, the first device is a network device, the acquiring, by the first device, the path priority information includes:

acquiring, by the first device, the path priority information from a second device stored with subscription information of a terminal device.

In conjunction with the first aspect, in some implementations of the first aspect, the target access path is a $3^{rd}$ generation partnership project 3GPP path or a non-3GPP path.

If the target access path is a 3GPP path, the service to be accessed may be accessed through a 3GPP network (such as a long term evolution (LTE) network, a 5G network or the like), alternatively, if the target access path is a non-3GPP path, the service to be accessed may be accessed through a non-3GPP network, such as a WLAN.

In a second aspect, a service access device is provided for performing the method in the first aspect described above or any possible implementation of the first aspect. In particular, the device includes a unit for performing the method in the first aspect described above or any possible implementation of the first aspect.

In a third aspect, a service access device is provided, which includes: a memory, a processor, an input interface, and an output interface. The memory, the processor, the input interface, and the output interface are connected by a bus system. The memory is configured to store an instruction, and the processor is configured to execute the instruction stored in the memory for performing the method in the first aspect described above or any possible implementation of the first aspect.

In a fourth aspect, a computer storage medium is provided, which is configured to store a computer software instruction including programs designed for implementing the above aspects that is used for performing the method in the first aspect described above or any possible implementation of the first aspect.

In a fifth aspect, a computer program product is provided, including an instruction which, when executed on a computer, causes a computer to perform the method in the first aspect described above or any possible implementation of the first aspect.

BRIEF DESCRIPTION OF DRAWING(S)

DESCRIPTION OF EMBODIMENTS

Technical solutions in the embodiments of the present application will be clearly and comprehensively described below with reference to the accompanying drawings in the embodiments of the present application.

It should be understood that the terms such as "system" and "network" herein are typically interchangeable. The term such as "and/or" herein is merely an association between associated objects, which indicates that there may be three relationships, for example, A and/or B may indicate presence of A only, of both A and B, and of B only. In addition, the character "/" herein generally indicates that contextual objects have an "or" relationship.

The technical solutions in the embodiments of the present application can be applied to various communication systems, such as a global system of mobile communication ("GSM" for short), a code division multiple access ("CDMA" for short) system, a wideband code division multiple access ("WCDMA" for short) system, a general packet radio service ("GPRS" for short), a long term evolution ("LTE" for short) system, an Frequency Division Duplex ("FDD" for short) system, an LTE time division duplex ("TDD" for short), a universal mobile telecommunication system ("UMTS" for short) or a worldwide interoperability for microwave access ("WiMAX" for short) communication system, or a future 5G system, etc.

Figure 1:
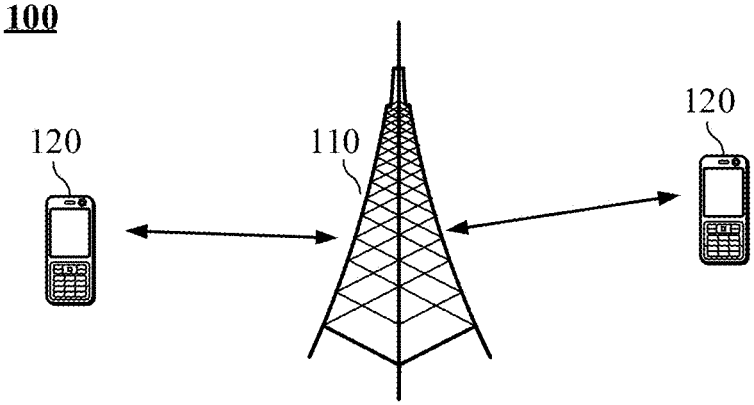
FIG. 1 is a schematic diagram of a communication system according to an embodiment of the present application.

FIG. 1 shows a wireless communication system 100 applied in the embodiments of the present application. The wireless communication system 100 may include a network device 110. The network device 100 may be a device that communicates with a terminal device. The network device 100 may provide a particular geographic area with a communication coverage and may communicate with a terminal device (e.g., UE) located within the coverage. In an implementation, the network device 100 may be a base station (Base Transceiver Station, BTS) in the GSM system or the CDMA system, or a base station (NodeB, NB) in the WCDMA system, or an evolved base station (Evolutional Node B, eNB or eNodeB) in the LTE system, or a wireless controller in a cloud radio access network (CRAN), alternatively, the network device may be a relay station, an access point, a vehicle-mounted device, a wearable device, a network side device in a future 5G network or a network device in a future evolutional public land mobile network (PLMN).

The wireless communication system 100 also includes at least one terminal device 120 located within the coverage of the network device 110. The terminal device 120 may be movable or stationary. In an implementation, the terminal device 120 may refer to an access terminal, User Equipment (UE), a subscriber unit, a subscriber station, a mobile station, a remote station, a remote terminal, a mobile device, a user terminal, a terminal, a wireless communication device, a user agent, or a user device. The access terminal may be a cellular phone, a cordless phone, a session initiation protocol (SIP) phone, a wireless local loop (WLL) station, a personal digital assistant (PDA), a handheld device with wireless communication functions, a computing device or other processing devices connected to a wireless modem, a vehicle-mounted device, a wearable device, a terminal device in the future 5G network, or a terminal device in the future evolutional PLMN.

In an implementation, device to device (D2D) communications may be performed between terminal devices 120.

In an implementation, the 5G system or network may also be referred to as a new radio (NR) system or network.

FIG. 1 exemplarily shows one network device and two terminal devices. In an implementation, the wireless communication system 100 may include a plurality of network devices and other numbers of terminal devices may be included within the coverage of each of the network devices, this is not limited in the embodiment of the present application.

In an implementation, the wireless communication system 100 may further include other network entities, such as a network controller, a mobility management entity and the like; this is not limited in the embodiment of the present application.

In the communication system of the embodiment of the present application, a terminal device may access a service through a 3GPP network (such as an LTE network, a future 5G network or the like) or a non-3GPP network (such as a Wireless Local Area Network (WLAN) or the like). A service access management node on the network device side may manage the service accessed through the 3GPP network or the non-3GPP network. For the service access management node, it is an urgent problem to be solved with regard to selection of any suitable service access path to improve user experience.

Figure 2:
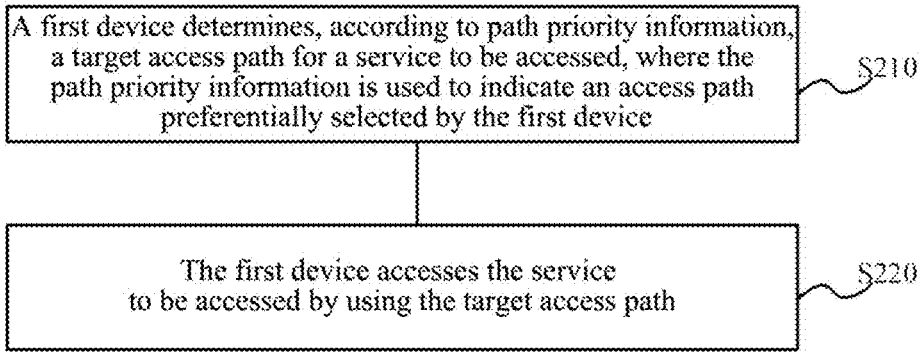
FIG. 2 is a schematic flowchart of a service access method according to an embodiment of the present application.

FIG. 2 schematically shows a service access method 200 according to an embodiment of the present application. The method 200 can be applied to the wireless communication system 100 described above, but the embodiments of the present application are not limited thereto.

As shown in FIG. 2, the method 200 includes the following content:

S210, a first device determines, according to path priority information, a target access path for a service to be accessed, where the path priority information is used to indicate an access path preferentially selected by the first device; and S220, the first device accesses the service to be accessed by using the target access path.

In an embodiment of the present application, the first device may be a terminal device or a network device, for example, a service access management node, or a user plane (UP) function entity. The path priority information may include information on at least one access path which may be set by a user according to his preference and which may be related to a service type of an access service, service access time or a service access location.

Therefore, for the service access method in the embodiment of the present application, the first device may determine, according to path priority information, a target access path for a service to be accessed, and thus access the service to be accessed by using the target access path. Since the path priority information is usually set by a user according to his preference, user experience can be improved by accessing the service to be accessed with the use of the target access path that is determined according to the path priority information.

In an implementation, the target access path is a $3^{rd}$ generation partnership project 3GPP path or a non-3GPP path.

If the target access path is a 3GPP path, the service to be accessed may be accessed through a 3GPP network (such as an LTE network, a 5G network or the like); alternatively, if the target access path is a non-3GPP path, the service to be accessed may be accessed through a non-3GPP network, such as a WLAN.

In a possible embodiment, the path priority information includes a priority order of at least one access path, and the step of a first device determining, according to path priority information, a target access path for a service to be accessed includes: determining, from the at least one access path, the target access path for the service to be accessed.

That is, the path priority information may include information on a priority order of at least one access path, and the first device may select, according to the priority order of the at least one access path, the target access path for the service to be accessed. For example, an access path with the highest priority may be selected from the at least one access path as the target access path for the service to be accessed, or an access path may be randomly selected from the at least one access path as the target access path, or the like; since the at least one access path is the preferentially selected access path that is set by the user, the use of one of the at least one access path as the target access path for the service to be accessed can improve user experience.

As an embodiment, the path priority information includes: a correspondence between the preferentially selected access path and at least one of a service type of the service to be accessed, time when the service to be accessed is initiated, and an area in which the service to be accessed is initiated.

By way of an example instead of a limitation, the path priority information may include at least one of a first correspondence between the service type of the service to be accessed and the preferentially selected access path, a second correspondence between the time when the service to be accessed is initiated and the preferentially selected access path, and a third correspondence between the area in which the service to be accessed is initiated and the preferentially selected access path; alternatively, the path priority information may further include a fourth correspondence among the service type of the service to be accessed and the time when the service to be accessed is initiated and the preferentially selected access path, or a fifth correspondence among the service type of the service to be accessed and the area in which the service to be accessed is initiated and the preferentially selected access path, or a sixth correspondence among the area in which the service to be accessed is initiated and the time when the service to be accessed is initiated and the preferentially selected access path, this is not limited in the embodiment of the present application.

In an implementation, the path priority information may further include a correspondence between other information of the service to be accessed and the preferentially selected access path, such as a correspondence between a service requirement of the service to be accessed and the preferentially selected access path, and the like.

In some possible embodiments, S210 may include:

the first device determines the target access path for the service to be accessed according to the path priority information and the at least one of the service type of the service to be accessed, the time when the service to be accessed is initiated, and the area in which the service to be accessed is initiated.

For example, the first device may determine the target access path according to the service type of the service to be accessed and the path priority information, or may determine the target access path according to the service type of the service to be accessed and the time when the service to be accessed is initiated, or may determine the target access path according to the service type of the service to be accessed, the time when the service to be accessed is initiated, and the area in which the service to be accessed is initiated.

In an implementation, the step of the first device determining the target access path for the service to be accessed according to the path priority information and the at least one of the service type of the service to be accessed, the time when the service to be accessed is initiated, and the area in which the service to be accessed is initiated includes:

determining, by the first device, the target access path for the service to be accessed according to the service type of the service to be accessed and a first correspondence between the service type of the service to be accessed and the preferentially selected access path.

In this embodiment, if the correspondence between the preferentially selected access path and the at least one of the service type of the service to be accessed, the time when the service to be accessed is initiated, and the area in which the service to be accessed is initiated may include a first correspondence between the service type of the service to be accessed and the preferentially selected access path, then the first device may determine, according to the service type of the service to be accessed and the first correspondence, the target access path for the service to be accessed.

In an implementation, the first correspondence may be a one-to-one correspondence or a many-to-one correspondence. For example, one service type may correspond to one access path, or many service types correspond to one access path. By way of an example instead of a limitation, a voice service or an emergency call service may correspond to a 3GPP path, and other types of services may correspond to a non-3GPP path.

In an implementation, the step of the first device determining the target access path for the service to be accessed according to the path priority information and the at least one of the service type of the service to be accessed, the time when the service to be accessed is initiated, and the area in which the service to be accessed is initiated includes:

the first device determines the target access path for the service to be accessed according to the time when the service to be accessed is initiated and a second correspondence between the time when the service to be accessed is initiated and the preferentially selected access path.

In this embodiment, if the correspondence between the preferentially selected access path and the at least one of the service type of the service to be accessed, the time when the service to be accessed is initiated, and the area in which the service to be accessed is initiated may include a second correspondence between the time when the service to be accessed is initiated and the preferentially selected access path, then the first device may determine, according to the time when the service to be accessed is initiated and the second correspondence, the target access path for the service to be accessed.

In an implementation, the second correspondence may be a one-to-one correspondence or a many-to-one correspondence, for example, one time period may correspond to one access path, or many time periods may correspond to one access path. By way of an example instead of a limitation, a morning peak (e.g., from 7 a.m. to 9 a.m.) and an evening peak (e.g., from 5 p.m. to 7 p.m.) may correspond to a 3GPP path, since during this time period, the user is generally on the way to work or on the way home from work so that a WLAN is unavailable. In this case, a 3GPP network may be used for service access so that user experience can be improved. Other time periods may correspond to a non-3GPP path, since during other time periods, the user is generally at home or at the company, use of the WLAN for service access can improve user experience.

In an implementation, the step of the first device determining the target access path for the service to be accessed according to the path priority information and the at least one of the service type of the service to be accessed, the time when the service to be accessed is initiated, and the area in which the service to be accessed is initiated includes:

the first device determines the target access path for the service to be accessed according to the area in which the service to be accessed is initiated and a third correspondence between the area in which the service to be accessed is initiated and the preferentially selected access path.

In this embodiment, if the correspondence between the preferentially selected access path and the at least one of the service type of the service to be accessed, the time when the service to be accessed is initiated, and the area in which the service to be accessed is initiated may include a third correspondence between the area in which the service to be accessed is initiated and the preferentially selected access path, then the first device may determine, according to the area in which the service to be accessed is initiated and the third correspondence, the target access path for the service to be accessed.

In an implementation, the third correspondence may be a one-to-one correspondence or a many-to-one correspondence. For example, one area may correspond to one access path, or many areas may correspond to one access path. By way of an example instead of a limitation, it may be set that an indoor area corresponds to a non-3GPP path and an outdoor area corresponds to a 3GPP path. Since a WLAN has poor signal quality in the outdoor area, in this case, a 3GPP network may be used for service access so that user experience can be improved, in a case where the WLAN is provided in the indoor area, the WLAN is used for service access so that user experience can be improved.

In the embodiment of the present application, the target access path for the service to be accessed may also be determined according to at least two of the first correspondence, the second correspondence, and the third correspondence, for example, it may be set that: the morning peak+indoor area corresponds to a non-3GPP path, and the morning peak+outdoor area corresponds to a 3GPP path; the voice service+indoor area corresponds to a non-3GPP path, and the voice service+outdoor area corresponds to a 3GPP path.

In the embodiment of the present application, the method 200 further includes:

the first device acquires the path priority information.

As a specific embodiment, the first device is a network device, the step of the first device acquiring the path priority information includes:

the first device acquires the path priority information from a core network device or a terminal device.

Specifically, the first device may be a service access management node; the service access management node may belong to a core network device, or may be a third-party device; and the terminal device may be stored with the path priority information. The path priority information may be generated according to user settings. After the path priority information is generated, the terminal device may transmit the path priority information to the core network device and the core network device may store the path priority information of the terminal device, so that the first device may acquire the path priority information from the terminal device, or may acquire the path priority information from the core network device.

As another embodiment, the first device is a network device, the step of the first device acquiring the path priority information includes:

the first device acquires the path priority information from a second device stored with subscription information of a terminal device.

Specifically, after generating the path priority information, the terminal device may transmit the path priority information to a second device stored with subscription information of the terminal device, and thus the first device may also acquire the path priority information from the second device.

The method embodiments of the present application have been described in detail above with reference to FIG. 2, while device embodiments of the present application will be described in detail below with reference to FIG. 3 to FIG. 4. It should be understood that the device embodiments correspond to the method embodiments. For a similar description, reference may be made to the method embodiments.

Figure 3:
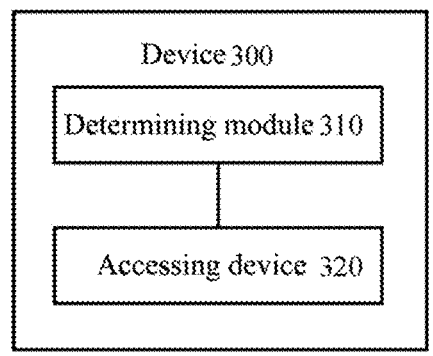
FIG. 3 is a schematic block diagram of a service access device according to an embodiment of the present application.

FIG. 3 shows a schematic block diagram of a service access device 300 according to an embodiment of the present application. As shown in FIG. 3, the device 300 includes:

a determining module 310, configured to determine, according to path priority information, a target access path for a service to be accessed, where the path priority information is used to indicate an access path preferentially selected by the service access device; and an accessing device 320, configured to access the service to be accessed by using the target access path.

In some possible embodiments, the path priority information includes a priority order of at least one access path, and the determining module 310 is specifically configured to:

determine, from the at least one access path, the target access path for the service to be accessed.

In some possible embodiments, the path priority information includes:

a correspondence between the preferentially selected access path and at least one of a service type of the service to be accessed, time when the service to be accessed is initiated, and an area in which the service to be accessed is initiated.

In some possible embodiments, the determining module 310 is specifically configured to:

determine the target access path for the service to be accessed according to the path priority information and the at least one of the service type of the service to be accessed, the time when the service to be accessed is initiated, and the area in which the service to be accessed is initiated.

In some possible embodiments, the determining module 310 is specifically configured to:

determine the target access path for the service to be accessed according to the service type of the service to be accessed and a first correspondence between the service type of the service to be accessed and the preferentially selected access path.

In some possible embodiments, the determining module 310 is further configured to:

determine the target access path for the service to be accessed according to the time when the service to be accessed is initiated and a second correspondence between the time when the service to be accessed is initiated and the preferentially selected access path.

In some possible embodiments, the determining module 310 is further configured to:

determine the target access path for the service to be accessed according to the area in which the service to be accessed is initiated and a third correspondence between the area in which the service to be accessed is initiated and the preferentially selected access path.

In some possible embodiments, the device 300 is a terminal device or a network device.

In some possible embodiments, the device 300 further includes:

an acquiring module, configured to acquire the path priority information.

In some possible embodiments, the device 300 is a network device, the acquiring module is specifically configured to:

acquire the path priority information from a core network device or a terminal device.

In some possible embodiments, the device 300 is a network device, the acquiring module is further configured to:

acquire the path priority information from a second device stored with subscription information of a terminal device.

In some possible embodiments, the target access path is a $3^{rd}$ generation partnership project 3GPP path or a non-3GPP path.

It should be understood that the device 300 according to the embodiment of the present application may correspond to the first device in the method embodiment of the present application, moreover, the foregoing and other operations and/or functions of the units in the device 300 respectively aim to implement corresponding processes of the first device in the method 200 shown in FIG. 2. For the sake of brevity, details will not be described herein again.

Figure 4:
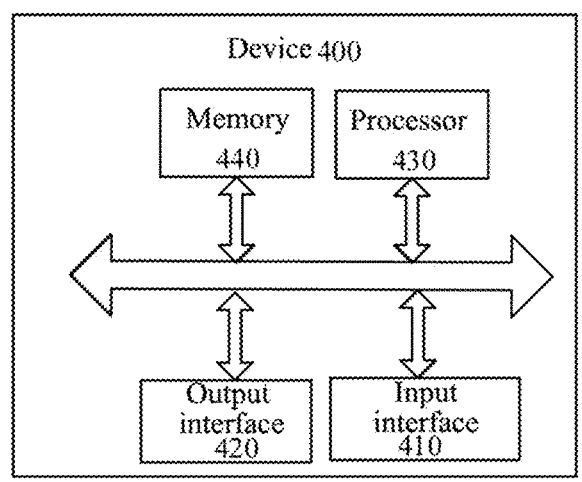
FIG. 4 is a schematic block diagram of a service access device according to another embodiment of the present application.

As shown in FIG. 4, an embodiment of the present application further provides a service access device 400. The device 400 may be the device 300 in FIG. 3, which can be configured to implement content pertaining to the first device corresponding to the method 200 in FIG. 2. The device 400 includes an input interface 410, an output interface 420, a processor 430, and a memory 440. The input interface 410, the output interface 420, the processor 430, and the memory 440 can be connected by a bus system. The memory 440 is configured to store programs, instructions or codes. The processor 430 is configured to execute the programs, the instructions or the codes in the memory 440 to control the input interface 410 to receive a signal and control the output interface 420 to transmit a signal and complete the operations in the foregoing method embodiments.

It should be understood that, in the embodiment of the present application, the processor 430 may be a central processing unit ("CPU" for short). The processor 430 may also be other general-purpose processor, digital signal processor (DSP), application specific integrated circuit (ASIC), field programmable gate array (FPGA) or other programmable logic device, discrete gate or transistor logic device, discrete hardware component, or the like. The general-purpose processor may be a microprocessor or the processor may also be any conventional processor or the like.

The memory 440 may include a read only memory and a random access memory, and provides instructions and data to the processor 430. A portion of the memory 440 may also include a non-volatile random access memory. For example, the memory 440 may also be stored with device type information.

During an implementation, content of the foregoing method may be implemented by an integrated logic circuit of hardware or an instruction in a form of software in the processor 430. The content of the method disclosed in conjunction with the embodiments of the present application may be directly implemented by a hardware processor, or may be implemented by a combination of hardware and software modules in the processor. The software module may be located in a storage medium mature in the art, such as a random access memory, a flash memory, a read only memory, a programmable read only memory, an electrically erasable programmable memory, a register, or the like. The storage medium is located in the memory 440. The processor 430 reads information in the memory 440 and implements the content of the above method in conjunction with its hardware. To avoid redundancy, details will not be described herein again.

In a specific implementation, the access module 320 in the device 300 shown in FIG. 3 may be implemented with the input interface 410 and the output interface 420 in FIG. 4, also, the determining module 310 and the acquiring module in the device 300 shown in FIG. 3 may be implemented with the processor 430 in FIG. 4.

It may be known to persons of ordinary skill in the art that, the units and the algorithm steps of each example that are described with reference to the embodiments disclosed herein can be implemented by electronic hardware or a combination of electronic hardware and computer software. The situation whether these functions are performed by hardware or software depends on specific applications and design constraints of the technical solutions. Persons skilled in the art may implement the described functions by using different methods for each specific application, but such implementation should not be regarded as going beyond the scope of the present application.

It may be clearly understood by a person skilled in the art that, for the purpose of convenient and brief description, reference may be made to the corresponding processes in the foregoing method embodiments for detailed working processes of the foregoing systems, devices, and units, and details will not be described herein again.

In several embodiments provided in the present application, it should be understood that the disclosed systems, devices, and methods may be implemented in other manners. For example, the described device embodiments are merely exemplary. For instance, the division of the units is merely a division of logical functions and there may be other divisions during actual implementations. For instance, multiple units or components may be combined or integrated into another system, or some features may be omitted or not performed. In addition, the presented or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts shown as units may or may not be physical units, that is, may be located in one position, or may be distributed on multiple network units. A part or all of the units may be selected according to actual needs to achieve the objectives of the scheme in the embodiments.

In addition, functional units in the embodiments of the present application may be integrated into one processing unit, or each of the units may exist alone physically, or two or more units are integrated into one unit.

If implemented in a form of a software functional unit and sold or used as an independent product, the functions may be stored in a computer-readable storage medium. Based on such an understanding, the technical solutions of the present application essentially, or the part contributing to the prior art, or a part of the technical solutions may be implemented in a form of a software product. The computer software product is stored in a storage medium, and includes several instructions for enabling a computer device (which may be a personal computer, a server, or a network device, etc.) to perform all or a part of the steps of the methods described in the embodiments of the present application. The foregoing storage medium includes: any medium that can store program codes, such as a USB flash disk, a mobile hard disk, a Read-Only Memory (ROM), a Random Access Memory (RAM), a magnetic disk, or an optical disc, etc.

The above descriptions are merely specific embodiments of the present application; however, the protection scope of the present application is not limited thereto. Any modification or replacement that may be readily conceived by persons skilled in the art within the technical scope disclosed in the present application should fall into the protection scope of the present application. Therefore, the protection scope of the present application shall be subject to the claims.

What is claimed is:

1. A service access method, comprising:
   determining, by a first device, according to path priority information, a target access path for a service to be accessed, wherein the path priority information is used to indicate an access path preferentially selected by the first device; and
   accessing, by the first device, the service to be accessed by using the target access path;
   wherein the first device is a network device, and the method further comprises:
   acquiring, by the first device, the path priority information from a second device stored with subscription information of a terminal device, wherein the path priority information is generated by the terminal device according to a preference of user and is transmitted to the second device by the terminal device;
   wherein the path priority information comprises:
   a correspondence among the preferentially selected access path and both of time when the service to be accessed is initiated and an area in which the service to be accessed is initiated;
   wherein the determining, by a first device, according to path priority information, a target access path for a service to be accessed comprises:
   determining, by the first device, the target access path for the service to be accessed according to the path priority information and the both of the time when the service to be accessed is initiated and the area in which the service to be accessed is initiated;
   wherein the determining, by the first device, the target access path for the service to be accessed according to the path priority information and the both of the time when the service to be accessed is initiated and the area in which the service to be accessed is initiated comprises:
   determining, by the first device, the target access path for the service to be accessed according to all of the time when the service to be accessed is initiated, the area in which the service to be accessed is initiated, and a sixth correspondence among the area in which the service to be accessed is initiated and the time when the service to be accessed is initiated and the preferentially selected access path;
   wherein the target access path is a $3^{rd}$ generation partnership project (3GPP) path or a non-3GPP path, and wherein a morning peak with an indoor area corresponds to the non-3GPP path, and the morning peak with an outdoor area corresponds to the 3GPP path.

2. The method according to claim 1, wherein the path priority information comprises a priority order of at least one access path, and the determining, by a first device, according to path priority information, a target access path for a service to be accessed comprises:
   determining, from the at least one access path, the target access path for the service to be accessed.

3. The method according to claim 1, wherein the path priority information further comprises:
   a correspondence between the preferentially selected access path and a service type of the service to be accessed.

4. The method according to claim 3, wherein the determining, by a first device, according to path priority information, a target access path for a service to be accessed further comprises:
   determining, by the first device, the target access path for the service to be accessed according to the path priority information and all of the service type of the service to be accessed, the time when the service to be accessed is initiated, and the area in which the service to be accessed is initiated.

5. The method according to claim 4, wherein the determining, by the first device, the target access path for the service to be accessed according to the path priority information and all of the service type of the service to be accessed, the time when the service to be accessed is initiated, and the area in which the service to be accessed is initiated comprises:
   determining, by the first device, the target access path for the service to be accessed according to all of the service type of the service to be accessed, the time when the service to be accessed is initiated, the area in which the service to be accessed is initiated, the sixth correspondence, and a first correspondence between the service type of the service to be accessed and the preferentially selected access path.

6. A service access device, comprising a memory and a processor, the memory being configured to store an instruction, and the processor being configured to execute the instruction stored in the memory for performing steps of:
   determining, according to path priority information, a target access path for a service to be accessed, wherein the path priority information is used to indicate an access path preferentially selected by the service access device; and
   accessing the service to be accessed by using the target access path;
   wherein the service access device is a network device, and the processor is configured to:
   acquire the path priority information from a second device stored with subscription information of a terminal device, wherein the path priority information is generated by the terminal device according to a preference of user and is transmitted to the second device by the terminal device;
   wherein the path priority information comprises:
   a correspondence among the preferentially selected access path and both of time when the service to be accessed is initiated and an area in which the service to be accessed is initiated;
   wherein the processor is further configured to execute the instruction stored in the memory for performing steps of:
   determining the target access path for the service to be accessed according to all of the time when the service to be accessed is initiated, the area in which the service to be accessed is initiated, and a sixth correspondence among the area in which the service to be accessed is initiated and the time when the service to be accessed is initiated and the preferentially selected access path;
   wherein the target access path is a $3^{rd}$ generation partnership project (3GPP) path or a non-3GPP path, and wherein a morning peak with an indoor area corresponds to the non-3GPP path, and the morning peak with an outdoor area corresponds to the 3GPP path.

7. The device according to claim 6, wherein the path priority information comprises a priority order of at least one access path, and the processor is configured to:

determine, from the at least one access path, the target access path for the service to be accessed.

8. The device according to claim 6, wherein the path priority information further comprises:
a correspondence between the preferentially selected access path and a service type of the service to be accessed.

9. The device according to claim 8, wherein the processor is further configured to execute the instruction stored in the memory for performing steps of:
determining the target access path for the service to be accessed according to the path priority information and all of the service type of the service to be accessed, the time when the service to be accessed is initiated, and the area in which the service to be accessed is initiated.

10. The device according to claim 9, wherein the processor is configured to execute the instruction stored in the memory for performing steps of:
determining the target access path for the service to be accessed according to all of the service type of the service to be accessed, the time when the service to be accessed is initiated, the area in which the service to be accessed is initiated, the sixth correspondence, and a first correspondence between the service type of the service to be accessed and the preferentially selected access path.

* * * * *